(12) United States Patent
Marais et al.

(10) Patent No.: US 8,428,340 B2
(45) Date of Patent: Apr. 23, 2013

(54) SCREEN SPACE PLANE IDENTIFICATION

(75) Inventors: Charles Claudius Marais, Duvall, WA (US); Joel Deaguero, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 785 days.

(21) Appl. No.: 12/563,456

(22) Filed: Sep. 21, 2009

(65) Prior Publication Data

US 2011/0069870 A1      Mar. 24, 2011

(51) Int. Cl.
*G06K 9/00* (2006.01)
(52) U.S. Cl.
USPC .......................................... 382/154; 345/424
(58) Field of Classification Search .................. 382/154, 382/294
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Trucco, E.; Isgro, F.; Bracchi, F.; , "Plane detection in disparity space," Visual Information Engineering, 2003. VIE 2003. International Conference on , vol., no., pp. 73-76, Jul. 7-9, 2003 URL: http://ieeexplore.ieee.org/stamp/stamp.jsp?tp= &arnumber=1341295&isnumber=29549.*

(Continued)

*Primary Examiner* — Hadi Akhavannik
(74) *Attorney, Agent, or Firm* — Alleman Hall McCoy Russell & Tuttle LLP (57) ABSTRACT

A method of finding and defining a plane includes screen-space scanning a plurality of rows of a depth image and interpolating a straight depth line through at least two depth values for each row. A pair of straight boundary lines are then fit to the endpoints of the straight depth lines, and a plane is defined to include these straight boundary lines.

19 Claims, 5 Drawing Sheets

U.S. PATENT DOCUMENTS

| | | | |
|---|---|---|---|
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,570,208 A * | 10/1996 | Kato et al. | 359/23 |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,973,700 A * | 10/1999 | Taylor et al. | 345/427 |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,014,473 A * | 1/2000 | Hossack et al. | 382/294 |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,102,865 A * | 8/2000 | Hossack et al. | 600/459 |
| 6,128,003 A | 10/2000 | Smith et al. | |
| 6,130,677 A | 10/2000 | Kunz | |
| 6,130,958 A * | 10/2000 | Rohler et al. | 382/131 |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,068,815 B2 | 6/2006 | Chang et al. | |
| 7,113,918 B1 | 9/2006 | Ahmad et al. | |
| 7,121,946 B2 | 10/2006 | Paul et al. | |
| 7,133,041 B2 * | 11/2006 | Kaufman et al. | 345/419 |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |

| | | | |
|---|---|---|---|
| 2004/0239670 | A1 | 12/2004 | Marks |
| 2005/0002559 | A1* | 1/2005 | Terauchi et al. ............... 382/154 |
| 2007/0126876 | A1 | 6/2007 | Gallagher et al. |
| 2007/0206008 | A1* | 9/2007 | Kaufman et al. ............. 345/424 |
| 2008/0026838 | A1 | 1/2008 | Dunstan et al. |
| 2009/0195555 | A1* | 8/2009 | Nystad et al. ................. 345/620 |
| 2009/0304264 | A1* | 12/2009 | Au et al. ........................ 382/154 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Okada, K.; Kagami, S.; Inaba, M.; Inoue, H.; , "Plane segment finder: algorithm, implementation and applications," Robotics and Automation, 2001. Proceedings 2001 ICRA. IEEE International Conference on , vol. 2, no., pp. 2120-2125 vol. 2, 2001 URL: http://ieeexplore.ieee.org/stamp/stamp.jsp?tp=&arnumber=932920&isnumber.*

Kida, et al. "Human Finding and Body Property Estimation by using Floor Segmentation and 3D Labelling", Retrieved at <<http://ieeexplore.ieee.org/xpl/freeabs_all.jsp?isnumber=30423&arnumber=1400777&count=172&index=146>>, Systems, Man and Cybernetics, 2004 IEEE International Conference on Oct. 10-13, 2004, vol. 3 , pp. 2924-2929.

Nishiwaki, et al. "Mixed Reality Environment for Autonomous Robot Development", Retrieved at <<http://ieeexplore.ieee.org/xpl/freeabs_all.jsp?arnumber=4543538>>, IEEE International Conference on Robotics and Automation, May 19-23, 2008, Pasadena, CA , pp. 2211-2212.

Rosselot, Donald W. "Processing Real-Time Stereo Video in Disparity Space for Obstacle Mapping", Retrieved at<<http://www.min.uc.edu/robotics/papers/theses2005/Thesis_DonaldRosselot.pdf/view>> Feb. 24, 2005, pp. 66.

Nuchter, et al. "Towards Semantic Maps for Mobile Robots", Retrieved at <<http://kos.informatik.uni-osnabrueck.de/download/ras2008.pdf>>, vol. 56 , Issue 11, 2008, pp. 915-926.

Yaguchi, et al. "Arbitrary Viewpoint Video Synthesis from Multiple Uncalibrated Cameras", Retrieved at << http://ieeexplore.ieee.org/Xplore/login.jsp?url=http%3A%2F%2Fieeexplore.ieee.org%2Fstamp%2Fstamp.jsp%3Farnumber%3D01262515&authDecision=-203>> IEEE Transactions on Systems, Man, and Cybernetics—Part B: Cybernetics, Feb. 2004, vol. 34, Issue 1, pp. 430-439.

Jasiobedzki, Piotr. "Detecting Driveable Floor Regions", Retrieved at<<http://ieeexplore.ieee.org/Xplore/login.jsp?url=http%3A%2F%2Fieeexplore.ieee.org%2Fstamp%2Fstamp.jsp%3Farnumber%3D00525806&authDecision=-203>> Aug. 5-9, 1995, vol. 1, pp. 264-270.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

SCREEN SPACE PLANE IDENTIFICATION

BACKGROUND

Depth cameras can be used to find the topology of a viewed scene. Whereas a conventional digital camera is capable of assigning each pixel a light intensity and/or color value, a depth camera is capable of assigning each pixel a depth value. The depth value is indicative of a distance between the depth camera and a surface observed at the relevant pixel, and the captured depth values are useable to construct a depth image. Even with a very accurate depth image from a depth camera, it can be challenging to identify different objects from the scene using the depth information.

SUMMARY

A method of finding and/or defining a plane includes screen-space scanning a plurality of rows of a depth image and interpolating a straight depth line through at least two depth values for each row. A pair of straight boundary lines are then fit to the endpoints of the straight depth lines, and a plane is defined to include these straight boundary lines.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to visual scene detection in general, and more particularly, to the identification of planar surfaces within a scene. While described below in the context of a gaming system, it is to be understood that planar surface identification, as described herein, may be used in a number of different applications.

Computing systems in accordance with the present disclosure may be used to quickly and accurately identify planar surfaces within a scene using screen-space calculations as opposed to more computationally expensive world-space calculations. Planar surfaces may be identified for a variety of different purposes. As nonlimiting examples, floors, ceilings, and/or walls may be identified as static background objects that can be removed from consideration when analyzing the movements of an active target (e.g., a human game player). As another example, floors and/or tabletops may be identified to facilitate accurate placement of virtual objects in a virtual room. As still another example, floors or other surfaces may be identified to assess a relative amount of camera tilt.

Figure 1:
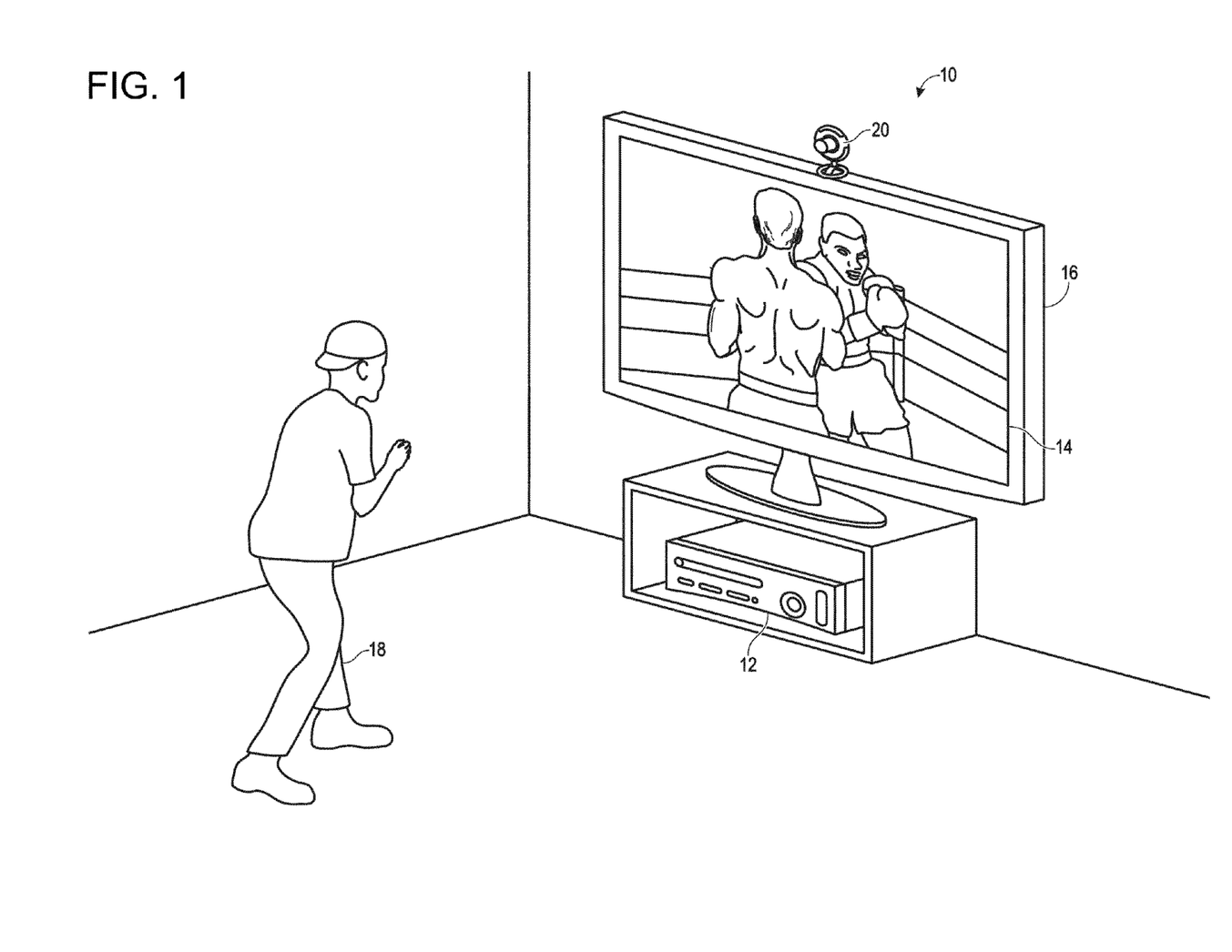
FIG. 1 shows a computing system including a depth camera.

FIG. 1 shows a nonlimiting example of a computing system 10. In particular, FIG. 1 shows a gaming console 12 that may be used to play a variety of different games, play one or more different media types, and/or control or manipulate non-game applications. FIG. 1 also shows a display 14 in the form of a high-definition television, or HDTV 16, which may be used to present visual information to users, such as user 18. Furthermore, FIG. 1 shows a capture device in the form of a depth camera 20, which may be used to visually monitor one or more users, such as user 18.

A computing system may be used to recognize, analyze, and/or track one or more targets, such as user 18. Target movements may be interpreted as operating system and/or application controls. Virtually any controllable aspect of an operating system and/or application may be controlled by movements of a target, such as user 18. To simplify analysis of such target movements, it may be beneficial to identify non-moving background aspects of the scene, so that such aspects can be effectively removed from the scene. As an example, it may be beneficial to remove a floor surface from the scene. Removing one or more background features can provide many benefits, including, but not limited to, simplifying processing of an image to those foreground features that are not removed, thus decreasing a total number of calculations to be performed in analyzing an image.

Figure 2:
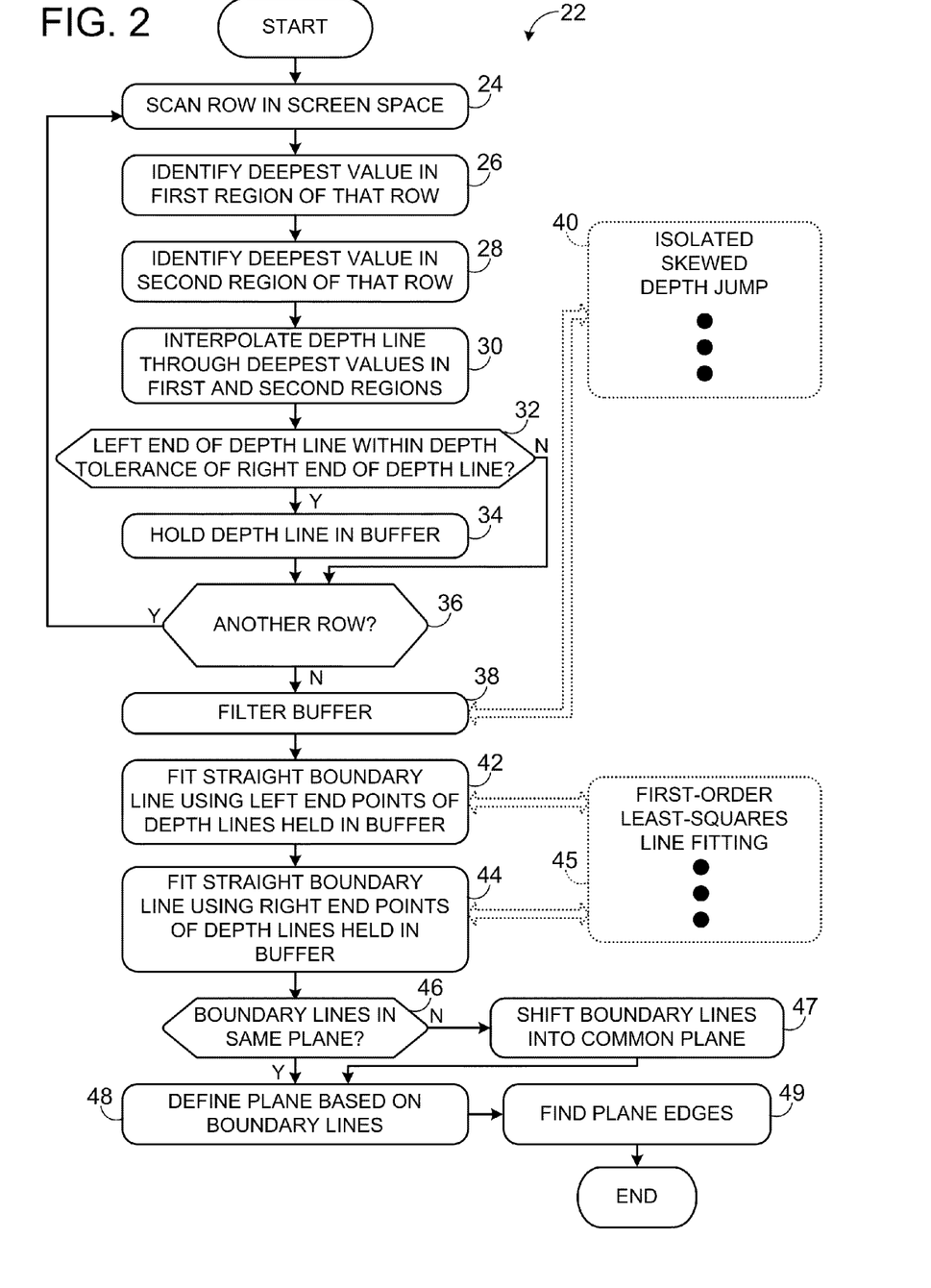
FIG. 2 shows an example method of defining a plane using screen space calculations.

As such, FIG. 2 shows an example method 22 of identifying a plane. For simplicity below, a floor is provided as an example plane which may be found using method 22. It is to be understood, however, that identifying other planes is also within the scope of this disclosure.

At 24, method 22 includes screen-space scanning a plurality of rows of a depth image. It is to be appreciated that method 22 begins with a scan in screen space, and the below described logic, calculations, and analysis is performed on screen space data and/or data directly derived from screen space data (e.g., point clouds representing lines interpolated from screen space data). More computationally expensive world space calculations are not used to find a plane according to method 22.

A depth image, as used herein, is an image that includes a depth value for each pixel in the image. Whereas a traditional digital image may include only color values for each pixel, a depth image includes depth information which can be used to assess the three-dimensional topology of a scene. In some embodiments, the depth image that is scanned in screen space may be a depth history image. In one nonlimiting example, a depth history image can be derived from two or more frames of depth information, where the depth value for each pixel is set to the deepest depth value that pixel experiences during the sample frames. As other examples, histograms, averages, standard deviations, and other numerical/statistical methods can be used to compute a depth history. The methods described herein are compatible with virtually any reasonably clean depth history image. A depth history image may help remove moving objects in the foreground of a scene (e.g., a human game player) while leaving the nonmoving background objects (e.g., floor, walls, furniture, etc.).

In some embodiments, less than an entire depth image may be scanned. In particular, a portion of the depth image that is to be scanned can be selected based on the type of plane that is to be identified. As an example, scanning the depth image may include scanning a bottom half of rows constituting the depth image, where the floor is likely to be found. As another example, if a ceiling is to be found, then a top half of rows may be scanned. It is to be understood that virtually any number of rows, or percentage of the scene, may be scanned without departing from the scope of this disclosure.

Likewise, the direction of scanning can vary. For example, scanning may include scanning horizontal rows of the depth image or vertical columns of the depth image. In some embodiments, the depth image may be rotated prior to scanning.

Figure 3:
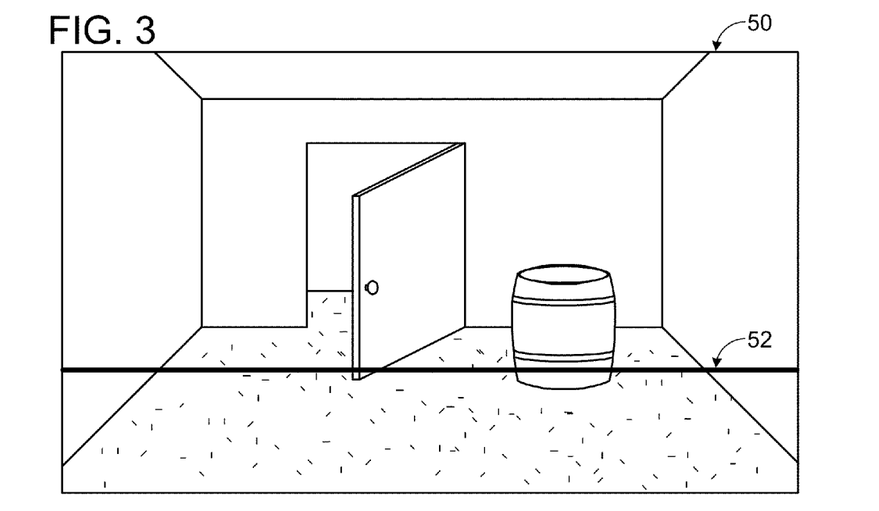
FIG. 3 somewhat schematically shows a scene in which a plane is to be found and one of a plurality of scan lines.

FIG. 3 somewhat schematically shows a scene 50 in which a plane is to be found. The scene is schematically shown as a three-dimensional line drawing. It is to be understood that the scene can be captured by a depth camera or other device capable of translating the scene into a depth image. FIG. 3 also schematically shows a scan line 52. For simplicity of illustration, scan line 52 is shown being applied to scene 50. However, it is to be understood that this representation is schematic, as the scan is actually applied to the depth image, which cannot be easily illustrated using a line drawing. Further, to aid understanding, only a single scan line 52 is shown in FIG. 3. It is to be understood, however, that plural rows of the depth image are scanned in screen space.

Figure 4:
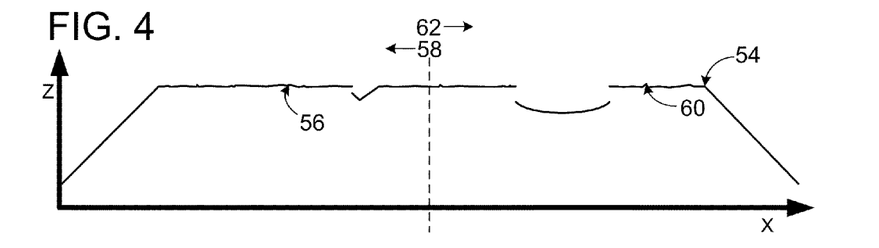
FIG. 4 somewhat schematically shows the depth values corresponding to the pixels scanned by the scan line of FIG. 3.

FIG. 4 somewhat schematically shows the depth values 54 corresponding to the pixels scanned by scan line 52 of FIG. 3. The x-coordinate is the screen space x-coordinate tracked along the horizontal axis of FIG. 4, and the z-coordinate, or depth value, is tracked along the vertical axis of FIG. 4. Because all depth values in FIG. 4 were scanned from the same row of pixels, all depth values in FIG. 4 have the same screen space y-coordinate.

Returning to FIG. 2, at 26, method 22 includes identifying a deepest value in a first region of each row, and at 28, method 22 includes identifying a deepest value in a second region of each row. The first and second regions can be selected in accordance with a type of plane that is to be identified. As an example, when a floor is to be identified, the first region may be a left half of the row and the second region may be a right half of the row. The deepest value in the first region may be referred to as the first deepest value, and the deepest value in the second region may be referred to as the second deepest value. As such, using this naming convention, the second deepest value may be deeper than the first deepest value in some scenarios.

As an example, FIG. 4 shows a deepest value 56 from a left half 58 of scan line 52 of FIG. 3. Likewise, FIG. 4 shows a deepest value 60 from a right half 62 of scan line 52 of FIG. 3.

Returning to FIG. 2, at 30, method 22 includes interpolating a straight depth line through at least two depth values for each row in the plurality of rows (e.g., the deepest value in the first region and the deepest value in the second region). The linear interpolation can be performed using 1.0/depth in order to account for perspective correctness in screen space.

Figure 5:
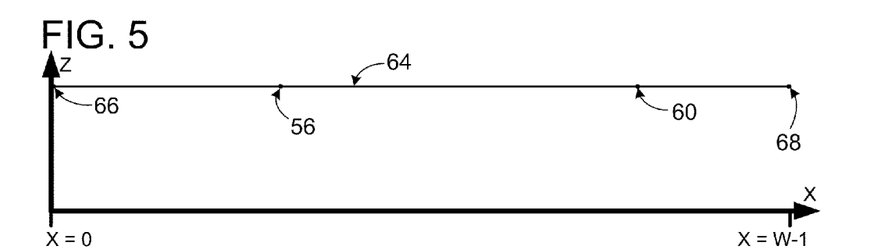
FIGS. 5 and 6 schematically shows a straight depth line interpolated through the deepest depth values from the left and right halves of FIG. 4.
Figure 6:
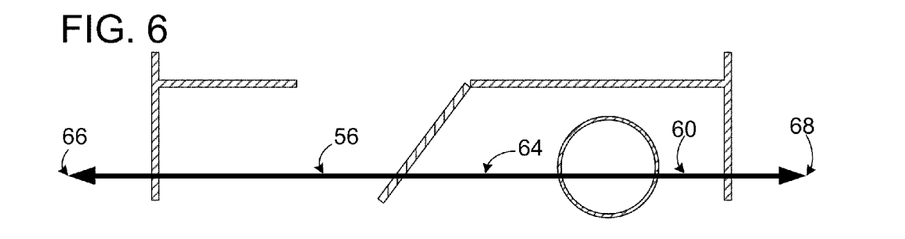

As an example, FIGS. 5 and 6 schematically shows a straight depth line 64 interpolated through deepest value 56 and deepest value 60. Each straight depth line may be held in a buffer as a plurality of points along that straight depth line. As an example, the buffer may include a two-dimensional array in which the x-coordinate and the y-coordinate serve as indices, and the interpolated z-coordinate for a pixel is held in the memory space addressed by the corresponding x-coordinate and y-coordinate indices for that pixel.

Each straight depth line includes opposite endpoints—one at x=0 and the other at x=W−1, where W is the horizontal pixel resolution of the depth image, or a subsampled or supersampled version thereof. For example, FIGS. 5 and 6 shows a first endpoint 66 at x=0 and a second endpoint 68 at x=W−1. In some embodiments, only the endpoints of a straight depth line are held in the buffer.

A straight depth line may optionally be left out of the buffer if the depths (i.e., z values) of the endpoints of the straight depth line differ from one another by more than a predetermined tolerance (e.g., depth values of endpoints outside a tolerance of 400 mm). For example, at 32 of FIG. 2, it can be determined if the left endpoint and the right endpoint are within a predetermined depth tolerance of one another. If the endpoints are within the predetermined depth tolerance, the straight depth line may be held in the buffer, as indicated at 34. If the endpoints are not within the predetermined tolerance, the straight depth line can be left out of the buffer.

At 36 of method 22, it is determined if another row is to be scanned, analyzed, and interpolated, as described above. As a nonlimiting example, a depth image may include a vertical resolution of 1080 pixels (i.e., row 0 through row 1079). As such, in embodiments where a bottom half of the depth image is to be scanned, rows 0 through 539 may be scanned in series, parallel, or in any other suitable order. If less than all of the desired rows have been scanned, process flow may return to 24, where such rows can be scanned. When all of the desired rows have been scanned, method 22 proceeds to 38.

At 38, method 22 includes filtering the buffer of straight depth lines. As indicated at 40, the buffer may be filtered to remove straight depth lines that have one or more characteristics thought to decrease the accuracy of the plane identification. Examples of such lines, which may be filtered, include straight depth lines that are isolated from other straight depth lines in the buffer, straight depth lines that are skewed more than a predetermined amount relative to other straight depth lines in the buffer, and straight depth lines having a depth that jumps greater than a predetermined amount relative to the depths of neighboring straight depth lines in the buffer.

Method 22 includes fitting a pair of straight boundary lines to a subset of endpoints of the straight depth lines. As shown at 42 a straight boundary line on the left side can be fit using a subset of left endpoints of the straight depth lines. As shown at 44 a straight boundary line on the right side can be fit using a subset of right endpoints of the straight depth lines. The boundary lines can be fit to the endpoints using any suitable technique. As a nonlimiting example, and as shown at 45, a first-order least-squares line fitting algorithm may be applied to the subset of first endpoints and the subset of second endpoints.

Figure 7:
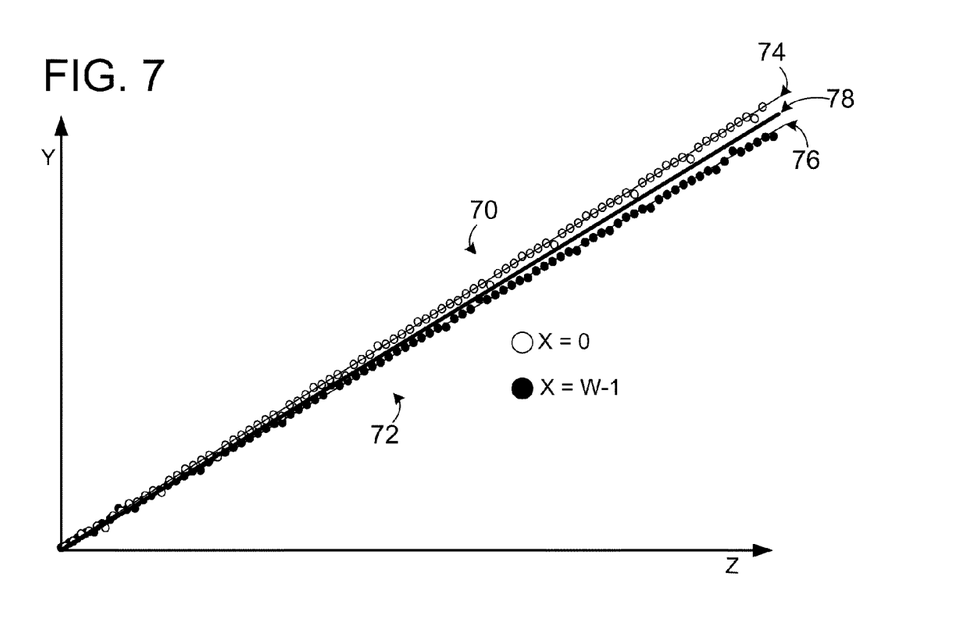
FIG. 7 shows a plot of the endpoints from straight depth lines derived from scan lines applied to the scene of FIG. 3.

FIG. 7 somewhat schematically shows a first subset of endpoints 70 (e.g., left endpoints at x=0) as white dots and a second subset of endpoints 72 (e.g., right endpoints at x=W−1) as black dots. A straight boundary line 74 is fit to the first subset of endpoints and a straight boundary line 76 is fit to the second subset of endpoints.

Returning to FIG. 2, at 46, method 22 includes determining if the boundary lines are in the same plane. If the boundary lines are not in the same plane, as shown in the example of FIG. 7, method 22 includes shifting the first straight boundary line and the second straight boundary line into a common plane, as shown at 47 of FIG. 2. In some embodiments, the boundary lines can be shifted into a plane whose slope is an average of the two boundary lines. For example, FIG. 7 shows a plane 78 to which the boundary lines can be shifted.

Returning to FIG. 2, at 48, method 22 includes defining a plane through the first straight boundary line and the second straight boundary line. Defining the plane through the first straight boundary line and the second straight boundary line may include defining a vector normal to the plane. Defining the plane through the first straight boundary line and the second straight boundary line may include filling a buffer with linear interpolations between the first straight boundary line and the second straight boundary line. For example, the buffer may include a two-dimensional array as described above.

Figure 8:
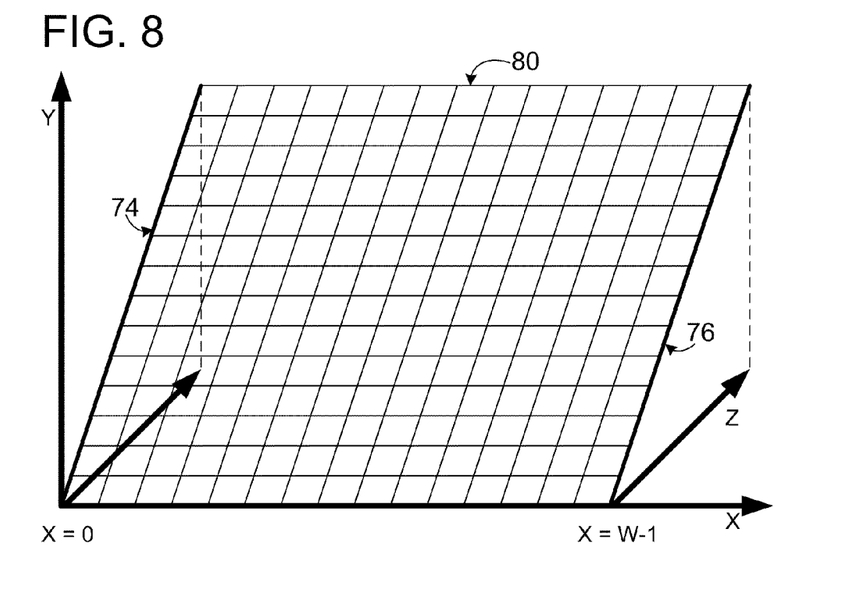
FIG. 8 shows a plane identified between boundary lines fit to the endpoints of FIG. 7.

FIG. 8 somewhat schematically shows straight boundary line 74 and straight boundary line 76 of FIG. 7, after such straight boundary lines have been shifted into the same plane. The boundary lines can be shifted prior to defining a plane 80, which is schematically shown as a grid in FIG. 8.

Returning to FIG. 2, at 49, method 22 may include identifying one or more edges intersecting the plane. Such edges may be identified where depth values in the depth image begin to deviate from depth values defined by the plane. For example, when a floor plane is identified and defined, edges may be identified where walls and/or pieces of furniture intersect the floor, because the depth values predicted by the identified plane will begin to deviate from the actual depth values observed in the depth image at such intersections. Such edges may be used to find holes in the plane (e.g., a window in a wall) or objects on the plane.

As described below with reference to FIG. 9, a variety of different computing systems may be used without departing from the spirit of this disclosure. The operating environment described with reference to FIG. 1 is provided as an example, but is not meant to be limiting in any way. To the contrary, the illustrated operating environment is intended to demonstrate a general concept, which may be applied to a variety of different operating environments without departing from the scope of this disclosure.

The methods and processes described herein may be tied to a variety of different types of computing systems. FIG. 1 shows a nonlimiting example in the form of gaming console 12, HDTV 16, and depth camera 20. As another, more general, example, FIG. 9 schematically shows a computing system 82 that may perform one or more of the plane identification methods and processes described herein. Computing system 82 may take a variety of different forms, including, but not limited to, gaming consoles, personal computing systems, military tracking and/or targeting systems, and character acquisition systems offering green-screen or motion-capture functionality, among others.

Computing system 82 may include a logic subsystem 84, a data-holding subsystem 86 operatively connected to the logic subsystem, a display subsystem 88, and/or a capture device 90. The computing system may optionally include components not shown in FIG. 9, and/or some components shown in FIG. 9 may be peripheral components that are not integrated into the computing system.

Logic subsystem 84 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 86 may include one or more physical devices configured to hold data and/or instructions executable by the logic subsystem to implement the herein described methods and processes. When such methods and processes are implemented, the state of data-holding subsystem 86 may be transformed (e.g., to hold different data). Data-holding subsystem 86 may include removable media and/or built-in devices. Data-holding subsystem 86 may include optical memory devices, semiconductor memory devices (e.g., RAM, EEPROM, flash, etc.), and/or magnetic memory devices, among others. Data-holding subsystem 86 may include devices with one or more of the following characteristics: volatile, nonvolatile, dynamic, static, read/write, read-only, random access, sequential access, location addressable, file addressable, and content addressable. In some embodiments, logic subsystem 84 and data-holding subsystem 86 may be integrated into one or more common devices, such as an application specific integrated circuit or a system on a chip.

Figure 9:
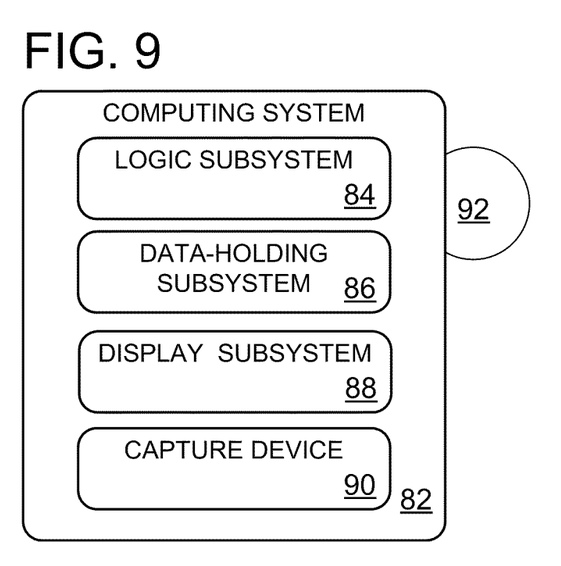
FIG. 9 schematically shows a computing system in accordance with the present disclosure.

FIG. 9 also shows an aspect of the data-holding subsystem in the form of computer-readable removable media 92, which may be used to store and/or transfer data and/or instructions executable to implement the herein described methods and processes.

Display subsystem 88 may be used to present a visual representation of data held by data-holding subsystem 86. As the herein described methods and processes change the data held by the data-holding subsystem, and thus transform the state of the data-holding subsystem, the state of display subsystem 88 may likewise be transformed to visually represent changes in the underlying data. Display subsystem 88 may include one or more display devices utilizing virtually any type of technology. Such display devices may be combined with logic subsystem 84 and/or data-holding subsystem 86 in a shared enclosure, or such display devices may be peripheral display devices, as shown in FIG. 1.

Computing system 82 further includes a capture device 90 configured to obtain depth images of one or more targets and/or scenes. Capture device 90 may be configured to capture video with depth information via any suitable technique (e.g., time-of-flight, structured light, stereo image, etc.). As such, capture device 90 may include a depth camera, a video camera, stereo cameras, and/or other suitable capture devices.

For example, in time-of-flight analysis, the capture device 90 may emit infrared light to the scene and may then use sensors to detect the backscattered light from the surfaces of the scene. In some cases, pulsed infrared light may be used, wherein the time between an outgoing light pulse and a corresponding incoming light pulse may be measured and used to determine a physical distance from the capture device to a particular location on the scene. In some cases, the phase of the outgoing light wave may be compared to the phase of the incoming light wave to determine a phase shift, and the phase shift may be used to determine a physical distance from the capture device to a particular location in the scene.

In another example, time-of-flight analysis may be used to indirectly determine a physical distance from the capture device to a particular location in the scene by analyzing the intensity of the reflected beam of light over time via a technique such as shuttered light pulse imaging.

In another example, structured light analysis may be utilized by capture device 90 to capture depth information. In such an analysis, patterned light (i.e., light displayed as a known pattern such as a grid pattern or a stripe pattern) may be projected onto the scene. On the surfaces of the scene, the pattern may become deformed, and this deformation of the pattern may be studied to determine a physical distance from the capture device to a particular location in the scene.

In another example, the capture device may include two or more physically separated cameras that view a scene from different angles, to obtain visual stereo data. In such cases, the visual stereo data may be resolved to generate a depth image.

In other embodiments, capture device 90 may utilize other technologies to measure and/or calculate depth values.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of scene analysis, image capture, face recognition, high-precision tracking of fingers (or other small features), light sensing, and/or other functions.

It is to be understood that at least some depth analysis operations may be executed by a logic machine of one or more capture devices. A capture device may include one or more onboard processing units configured to perform one or more depth analysis functions. A capture device may include firmware to facilitate updating such onboard processing logic.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of finding and defining a plane, comprising:
scanning in screen space a plurality of rows of a depth image;
identifying a first deepest value in a first region of each row;
identifying a second deepest value in a second region of each row;
interpolating a straight depth line through the first deepest value and the second deepest value for each row;
fitting a first straight boundary line using a subset of first endpoints of the straight depth lines;
fitting a second straight boundary line using a subset of second endpoints of the straight depth lines; and
defining the plane through the first straight boundary line and the second straight boundary line.

2. The method of claim 1, where the depth image is a depth history image.

3. The method of claim 1, where scanning in screen space the plurality of rows of the depth image includes scanning a bottom half of rows constituting the depth image.

4. The method of claim 1, where scanning in screen space the plurality of rows of the depth image includes scanning horizontal rows of the depth image.

5. The method of claim 1, where the first region is a left half of that row and the second region is a right half of that row.

6. The method of claim 1, where each straight depth line is held in a buffer as a plurality of points along that straight depth line.

7. The method of claim 1, where fitting the first straight boundary line and the second straight boundary line respectively includes applying a first-order least-squares line fitting algorithm to the subset of first endpoints and the subset of second endpoints.

8. The method of claim 1, where the first straight boundary line and the second straight boundary line are fit without using a straight depth line if a first endpoint of that straight depth line is not within a predetermined tolerance of a second endpoint of that straight depth line.

9. The method of claim 1, where the first straight boundary line and the second straight boundary line are fit without using a straight depth line if that straight depth line is isolated from other straight depth lines.

10. The method of claim 1, where the first straight boundary line and the second straight boundary line are fit without using a straight depth line if that straight depth line is skewed more than a predetermined amount relative to other straight depth lines.

11. The method of claim 1, where the first straight boundary line and the second straight boundary line are fit without using a straight depth line if a depth of that straight depth line jumps greater than a predetermined amount relative to depths of neighboring straight depth lines.

12. The method of claim 1, further comprising shifting the first straight boundary line and the second straight boundary line into a common plane prior to defining the plane through the first straight boundary line and the second straight boundary line.

13. The method of claim 1, where defining the plane through the first straight boundary line and the second straight boundary line includes defining a vector normal to the plane.

14. The method of claim 1, where defining the plane through the first straight boundary line and the second straight boundary line includes filling a floor buffer with linear interpolations between the first straight boundary line and the second straight boundary line.

15. The method of claim 1, further comprising identifying one or more edges intersecting the plane where depth values in the depth image begin to deviate from depth values defined by the plane.

16. The method of claim 1, where the plane is a floor.

17. A computing system, comprising:
a depth camera configured to capture depth information useable to construct a depth image;
a logic subsystem operatively connected to the depth camera; and
a data-holding subsystem holding instructions executable by the logic subsystem to:
scan in screen space a plurality of rows of a depth image;
identify a first deepest value in a first region of each row;
identify a second deepest value in a second region of each row;
interpolate a straight depth line through the first deepest value and the second deepest value for each row;
fit a first straight boundary line using a subset of first endpoints of the straight depth lines;
fit a second straight boundary line using a subset of second endpoints of the straight depth lines; and
define a plane through the first straight boundary line and the second straight boundary line.

18. The computing system of claim 17, where instructions executable to fit the first straight boundary line and the second straight boundary line do not use a straight depth line if a first endpoint of that straight depth line is outside of a predetermined tolerance compared to a second endpoint of that straight depth line.

19. The computing system of claim 17, further comprising instructions executable to shift the first straight boundary line and the second straight boundary line into a common plane prior to defining the plane through the first straight boundary line and the second straight boundary line.

\* \* \* \* \*

UNITED STATES PATENT AND TRADEMARK OFFICE
CERTIFICATE OF CORRECTION

PATENT NO. : 8,428,340 B2  Page 1 of 1
APPLICATION NO. : 12/563456
DATED : April 23, 2013
INVENTOR(S) : Marais et al.

It is certified that error appears in the above-identified patent and that said Letters Patent is hereby corrected as shown below:

On The Title Page,

In Page 3, in item (56), under "Other Publications" column 2, line 30, delete "Caimbridge," and insert -- Cambridge --, therefor.

In Page 3, in item (56), under "Other Publications" column 2, line 36, delete "Caimbridge," and insert -- Cambridge --, therefor.

Signed and Sealed this
Third Day of February, 2015

Michelle K. Lee
*Deputy Director of the United States Patent and Trademark Office*